Sept. 7, 1954  H. G. TREISS, JR  2,688,240
LIGHTER
Filed Aug. 9, 1950  2 Sheets-Sheet 2
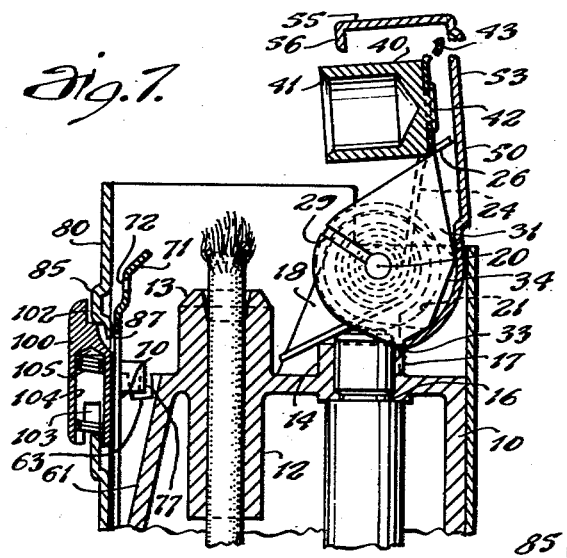
INVENTOR.
HERMAN GEORGE TREISS JR.
BY
ATTORNEY Patented Sept. 7, 1954

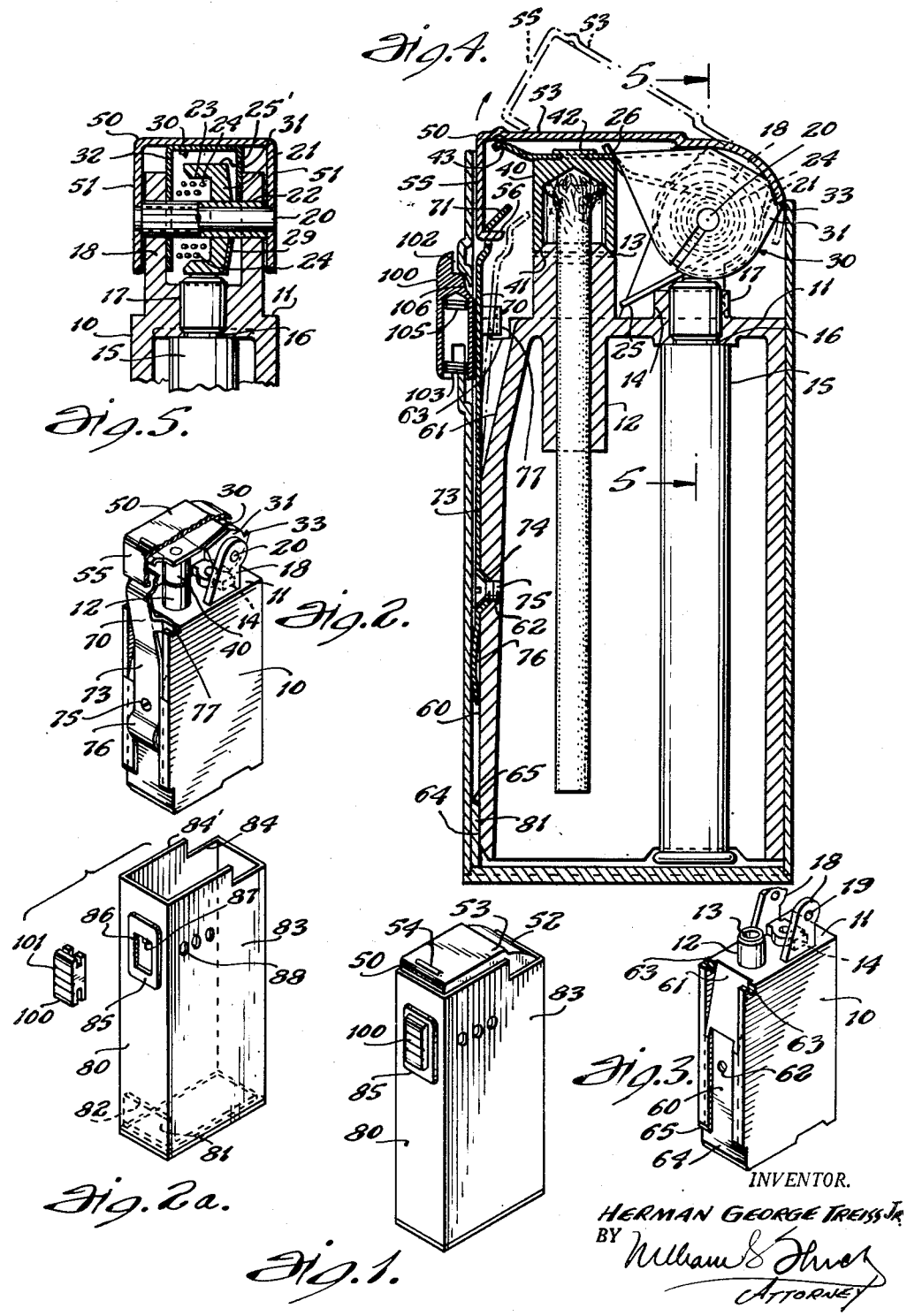

2,688,240

UNITED STATES PATENT OFFICE 2,688,240

LIGHTER

Herman George Treiss, Jr., New York, N. Y., assignor to American Safety Razor Corporation, Brooklyn, N. Y., a corporation of Virginia Application August 9, 1950, Serial No. 178,369

9 Claims. (Cl. 67—7.1)

1

This invention relates to improvements in a cigarette lighter of the pyrophoric type and primarily to the provision of novel and advantageous features of construction whereby the operation and assembly or disassembly of the lighter are improved or facilitated.

One of the objects of the invention lies in the provision of an improved latch and latch releasing mechanism which will prevent accidental release of the lighter cap and consequent accidental ignition of the lighter.

Another object of my invention lies in the provision of a lighter whose parts are simply constructed and easily assembled so that the lighter may be economically fabricated.

Still another object of the invention lies in the provision of a lighter having advantageous features of construction in its fuel tank, outer casing, snuffer holder and other constituent parts, including the following features among others: a one-piece fuel tank, open at the bottom, with the wick tube, flint tube opening and flint wheel axle supports integral thereon, one outer surface of the fuel tank being recessed to retain a cover latch spring within its confines; an open topped, fuel tank closing, outer casing slidable over the fuel tank and the latch spring and having a window for movably retaining a latch spring release member both in the assembled and disassembled condition of the lighter; a one-piece snuffer holding spring and flint wheel ratchet, pivoted on the flint wheel pin and held thereby in assembly with the lighter cover, the flint wheel, the fuel tank, and the cover latch spring; a snuffer supported near the free end of the snuffer spring in position to open and close the wick tube when turning motion is imparted to the snuffer spring by opening or closing of the lighter cover, the free end of the snuffer holding spring being slightly spaced from the under surface of the cover but in position to engage the cover and dampen fluttering of the snuffer spring and snuffer engendered by sudden stoppage of movement of the cover in its open position; a hollow latch releasing member removable only by special tool, assembled in said window of the outer casing by means of slots at the top and bottom in which the window edges are movably engaged to permit rectilinear movement in the plane of the window, an additional slot at the top of the release member and cooperating means in the upper edge of the window for permitting the upper portion of the latch release member to turn inwardly after said rectilinear movement, for a limited arc controlled by said means on

2 the window, to engage and displace the latch spring for releasing the spring opening cover; a latch spring for releasably securing the lighter cover in closed position adapted to be secured within a recess in the fuel tank but having a portion protruding from said recess for frictional engagement with the outer casing to releasably secure the casing assembly and the fuel tank assembly together; and cooperating means, on the fuel tank and the casing including a projection on one end and a recess on the other for receiving the projection when the two are properly positioned for assembly and for preventing completion of assembly when the two are improperly positioned.

For the attainment of these objects and such additional objectives, features and advantages as may hereinafter appear or be pointed out, I construct the lighter in the manner illustrated in the attached drawings, in which:

Fig. 1 is a perspective view of an assembled lighter according to my invention;

Fig. 2 is a perspective view showing the fuel tank assembly including the snuffer spring and cap latched in closed position, parts of the lighter cap being broken away to reveal concealed details;

Fig. 2A is a perspective view of the outer casing of my lighter with the latch releasing member shown exploded therefrom;

Fig. 3 is a perspective view of the fuel tank and its integral parts;

Fig. 4 is an enlarged central vertical section through the lighter;

Fig. 5 is a fragmentary view taken on line 5—5 of Fig. 4;

Fig. 6 is a fragmentary sectional view through the latch releasing member and similar to Fig. 4, but showing the latch releasing member operated to cap opening and latch releasing position;

Fig. 7 is a fragmentary sectional view similar to Fig. 4 but showing the lighter parts in their positions after release of the latch and opening of the cap;

Fig. 8 is a perspective view from the rear of my improved latch releasing member;

Fig. 9 is a fragmentary section taken on line 9—9 of Fig. 6;

Fig. 10 is a section taken on line 10—10 of Fig. 6; and

Fig. 11 is a top plan enlarged view of the snuffer holding spring.

Referring to the drawings, the preferred embodiment of my improved lighter is shown as comprising a fuel tank 10 which is preferably formed as an integral, one-piece casting open at the bottom and having side, front, rear and top walls. Centrally of the top wall 11 and close to one edge there is formed a wick tube 12 having a beveled outer end 13. Spaced from the wick tube and also centrally of the top wall is an integrally formed collar 14 for receipt of a flint tube 15, which may be secured therein by any desired method, as for example, by soldering at the neck 16. One side of the projecting portion of the flint tube collar is machined flat as indicated at 17 to provide a stop for the cap when pivoted to open position. Upstanding from the upper surface 11 of the fuel tank are two spaced parallel ears 18 provided with axially aligned openings 19 which function as bearing supports for the pivot pin 20 of the flint wheel.

The flint wheel 21 is shown in Fig. 5 as comprising a wheel toothed on its outer circumference 25', provided with ratchet teeth on one side and mounted on a sleeve 22 which surrounds the pivot pin 20. The opposite side of the flint wheel is hollowed or recessed as indicated at 23 for reception of a double layer coil spring 24, the ends of which 25 and 26 abut the flint tube collar and the lighter cap respectively so as to urge the latter into open position.

The lighter cap 50 is provided with downturned flanges 51, see Fig. 5, which are apertured to receive the flint wheel axle 20 and which embrace the outer surface of the flint wheel supports 18. Above the flint wheel the cap is formed with a curved surface 52 which merges forwardly, into a flat horizontal surface 53. This surface may be provided with any desired means to provide frictional engagement with the finger of the operator for closing the cap, as for example, the upwardly offset ridge 54 shown in Fig. 1. Cap 50 is provided at its free end with a downturned flange 55 from which a latch shoulder 56 projects inwardly.

A snuffer holder 30 is also mounted to rotate on the flint wheel axle or pin 20. Member 30 is preferably formed of resilient spring material and stamped or bent into the form shown best in Figs. 2, 5 and 11. The snuffer holder has two parallel sides 31 and 32 having aligned openings for horizontally receiving the pivot pin sleeve 22. Side 31 has an integral ratchet tooth 29 which engages the flint wheel teeth to turn the flint wheel in one direction, sliding over the teeth upon turning movement in the reverse direction in a well known manner. A V-shaped notch 33 is formed in the upper, rear corner of side 31 and is adapted to impart snuffer opening movement to the snuffer and snuffer holder from the rear edge of the lighter cap which seats therein. The sides 31 and 32 are joined by a flat web 34 from which a snuffer holding arm 35 protrudes forwardly in a slight downward angle. The central portion of the elongated resilient arm is reverse bent to provide a flat portion at 36 which is nearly parallel to the under surface of the lighter cap. An opening 37 for securing the snuffer 40 is provided in portion 36. The free or distal end of arm 35 is bent upwardly at 43 to form a buffer portion. Arm 35 is separated from the side walls 31 and 32 by means of two slots 38 and 39, which increase the flexibility of arm 35. Slot 39 is much wider than slot 38 to permit passage of the spring end 26 into engagement with the lighter cap.

Snuffer 40 is an inverted cup having a beveled lower end 41 for mating with the beveled surface 13 on the wick tube. The upper surface of the snuffer may be secured flush against the flattened portion 46 of the snuffer holder by any desirable means such as rivet 42 whose head is peened over the snuffer holding arm to hold the two rather loosely together.

The flint wheel, snuffer holder and lighter cap are secured together by assemblage only with pivot 20 and are arranged as shown in Fig. 7 when the cap is in opened position. The snuffer web 34 seats in the curved portion of the under surface of cap 50 with the arm 35 extending inwardly at a slightly downward angle to the under surface of the cap so that the flat snuffer holder portion 36 is also only slightly angled with respect thereto and spaced therefrom. The upturned distal end 43 of the snuffer holder is preferably spaced slightly from the undersurface of the cap and is free to move into engagement with the undersurface and then longitudinally thereof after engagement. Upon closing movement of the cap 50 rotation is imparted to the snuffer holder at the forward, cap engaging, edge of web 34, so that the snuffer 40 will turn and engage the wick tube. Upon making such engagement the snuffer 40 and snuffer holder portion 36 will move with respect to the cap, closing the space between them until the cap latching projection 56 is engaged in the latch opening 72. The distal end 43 of the snuffer holding arm is preferably so dimensioned as to engage the undersurface of the cap with slight pressure just before the final latching position of the cap is reached, and further movement of the snuffer 40 engendered by engagement with the wick tube is yieldingly resisted by both ends of the snuffer holding spring 39 in their engagement with the under side of the cap, causing the snuffer to move longitudinally of the wick and the free end 43 of the snuffer holder spring to move longitudinally with respect to the lighter cap.

It will be noted that the above-described construction provides a buffer action against rebound of the snuffer 40. When the cover is released its opening action under the urgency of the spring 24 is extremely rapid until it reaches the limit stop 17, see Fig. 7, at which time its movement stops very suddenly. This causes the snuffer to move rapidly with the cap by reason of engagement of the snuffer holder notch 33 with the rear edge of the cap, and therefore to be overthrown in the direction of the inner surface of the cap when the cap suddenly stops. Any excessive overthrow will bring the distal end of the snuffer holding spring against the undersurface of the cap and dampen the flutter which otherwise would be engendered in the snuffer holder spring and snuffer. In the closed position of the lighter cover 50 the snuffer 40 is held in engagement with the wick tube by pressure of the snuffer holder spring 35, but is free to fluctuate as for example when the lighter is dropped or placed on a table with some force. Here again the distal end of the snuffer holder spring, by engaging the cap, will dampen and prevent excessive opening movement of the snuffer with respect to the wick tube.

It will be apparent that opening movement of the lighter cap and snuffer imparts turning movement of the flint wheel so as to ignite the wick by means of turning engagement of the snuffer holder ratchet 29 with one of the flint wheel teeth. Turning movement of the cap in the lighter closing and flame snuffing direction does not rotate the flint wheel by reason of the slipping of the ratchet 29 over the flint wheel teeth.

A recess 60 of varying depth is formed in one side of the fuel tank 10, the depth being much greater at the upper end 61 to provide space for movement of a spring latch, see Fig. 3. A counter-sunk and threaded opening 62 is formed in recess 60 for receipt of the latch holding means. The lower ends of the walls forming recess 60 are provided with beveled shoulders 65, adjacent the lower portion 64 of the tank, which function in a manner to be hereafter described.

A latch member 70, preferably stamped and formed in one piece from spring-like resilient material is assembled in recess 60 by any desired means, a screw with counter-sunk head being shown in Fig. 2 for this purpose. At its upper end the latch member 70 has an inwardly angled cam surface 71 below which is a rectangular latch window 72 which receives the cap shoulder 56. Below the window 72 the latch member is bent inwardly and then outwardly once more at 73. In portion 73 the material is cupped and pierced to form a counter-sink and opening at 74 for receiving the head of the latch securing screw 75. One portion of the latch member is bent outwardly to form a convex surface 76 protruding from the fuel tank recess 60. This portion is illustrated as being at the bottom end, but may be placed elsewhere. Surface 76 rigidifies and strengthens the resiliency of the latch member, and is also useful to frictionally hold the outer casing and the fuel tank together under the increased pressure of portion 76 when squeezed and flattened into the recess 60 as shown best in Fig. 4.

The upper portion of the latch 70 is desirably formed with a pair of laterally extending ears 77 which ride in notches 63 provided at the upper surface of the walls forming recess 60 in the fuel tank. The initial assembly of the latch with the fuel tank is facilitated by the presence of ears 77 since the latch may be merely dropped into place with the ears seated in notches 63 thereby properly aligning the openings 74 and 62 for reception of screw 75. Further, after assembly, the notches 63 act as stops to limit outward movement of the latch with respect to the fuel tank and cover 50 so that the cover shoulder 56 can at all times be properly engaged by the latch and prevent jamming of the cover rearwardly of latch cam portion 71 when the fuel tank is removed from the outer casing for refilling or during reinsertion of the fuel tank into the casing.

The fluid tank, flint tube, flint wheel, snuffer holder, snuffer and lighter cap together with its latch are assembled to form a unit as shown in Fig. 2. This assembly requires the use of only two separable fastening means, one being the pivot pin 20 for the flint wheel sub-assembly and the other being the screw 75 for holding the latch spring. An outer casing 80, rectangular in cross-section, and closed on all sides save the top, is separably attachable to fit snugly about and close the open bottom of the fuel tank 10. In the lower part of the casing 80, at one side, there is provided an inward projection, preferably a separate part 81 welded thereto and having a shoulder 82. Projection 81 is adapted to be received against the lowermost portion 64 of the fuel tank, when the casing and fuel tank are assembled properly with shoulder 82 engaging the beveled shoulders 65 on the fuel tank. If the fuel tank and outer casing are slid together with one reversed, i. e., turned 180°, the fuel tank is capable of assembly only to the depth of the shoulder 82 which leaves its upper end projecting from the mouth of the outer casing and serves to warn the user that the two parts have been improperly assembled.

Casing 80 is provided near its upper edge with openings 88 to permit circulation of air to and upwardly past the wick flame. The casing top edges are stepped downwardly at 84 so that the curved portion 52 of the cap is visible thereabove. One wall of the outer casing has a rectangular portion 85 offset outwardly to provide space between this portion and the outer surface of the adjacent fuel tank wall.

A window opening 86 is provided in the portion 85 for securement of a latch release member 100. The fuel tank may be filled with an absorbent material and fluid not shown, and the tank assembly inserted as a unit into the upper end of the outer casing, to which is assembled the latch releasing member 100. The outer casing thus serves to close the lower open end of the fuel tank. In sliding the two assemblies together the convex portion of the latch spring 76 is squeezed between the outer casing and the fuel tank and flattened into its receiving groove 60 so that when it is desired to refill the tank, or disassemble the lighter for servicing or repair of other parts, the outer casing need merely be slidably removed from the flint tube assembly against the opposing pressure of the latch spring portion 76. The fuel tank assembly is removable as a unit from the outer casing in which the latch releasing member 100 is retained.

In order to safeguard against accidental ignition of the lighter, it is desirable that the latch releasing member require movement in two different directions to effect release of the latch spring 70. It is also desirable that the latch releasing member be at all times assembled to and under the control of the outer casing in spite of such movement in both directions. I therefore provide cooperating means on the upper edge of the window 86 and the adjacent end of the latch releasing member 100 to limit the latch releasing member to an initial movement in one direction and then to release it for its subsequent movement in a second latch releasing direction without releasing said end from control by said edge of the window.

These control means may comprise a projection on one member and a cooperating recess in the other member.

In the drawings, particularly Figs. 2A, 4, 6 and 8, I have illustrated a preferred construction in which the projection 87 is placed on the upper edge of the casing window and the cooperating recess is provided in the adjacent end of the latch release member 100. The projection 87 is an inwardly and downwardly turned finger, depending centrally from the upper edge of the casing window 86 and cooperates with the recesses 102 and 106 in the upper end of the latch release member.

I shall now describe the specific construction of the preferred embodiment of the latch releasing member and its manner of coaction with the latch spring and casing window. The releasing member comprises a generally rectangular finger piece 100, best shown in Figs. 6 and 8, the outer surface of which is ridged, knurled or otherwise provided with frictional portions 101 for finger engagement. The upper and lower ends of the finger piece are each slotted laterally from side to side, as shown at 102 and 103 respectively, the slots being in the plane of the window 86 and serving to restrict the motion of the finger-piece to this plane initially. The distance from either end of the finger-piece to the bottom of the slot at the opposite end of the finger piece is preferably slightly less than the height of the window. Both slots are purposely widened, the lower slot being widened to permit fulcruming or turning movement of the finger piece with respect to the lower edge of the window. The upper slot 102 is widened to ensure a snap upward return of the finger piece to its initial position upon release by the finger. Internally the finger piece is hollowed, being provided with a bore 104 which extends upwardly from the lower edge toward upper slot 102. Bore 104 communicates with the slot 103 and houses a resilient member, preferably a coil spring 105 receivable into the bore through its mouth at the lower edge of the finger piece. An additional slot 106 is formed in the inner wall of slot 102 in a transverse direction thereto. Slot 106 functions to normally receive the finger 87.

To assemble the latch releasing member 100 with the outer casing, the member is brought downwardly at an angle to engage slot 103 over the lower edge of window 86 and this motion is continued to compress the spring 105 until the upper edge of the finger piece is aligned with the lower edge of the window. The finger piece length and the height and width of slot 103 taken in relation to the thickness of the window edge are so dimensioned as to cause the inner edge of the upper end of the finger piece to engage the upper edge of the window when the finger piece is angled to the degree required in the assembly operation. Pressure inwardly on the upper end of the finger piece at this time will cause the finger piece to snap past the edge of window and enable coil spring 105 to expand and force the finger piece 100 upwardly in the plane of the casing window to its normal position shown in Fig. 4. When in this position the inner and outer walls of slots 102 and 103 rather loosely embrace the window edges, securing the latch releasing member to the outer casing and permitting only slight lateral displacement inwardly and outwardly which is insufficient to operate the latch spring 70. To release the latch, finger pressure must be applied to member 100 to move it in a downward direction in the plane of the casing window a distance equal to the height of upper slot 102, at which time finger pressure inwardly causes the release member to pivot about the lower edge of the window, while the upper edge of the finger-piece enters the window. The angular motion of the finger piece takes place about the lower edge of the window as a fulcrum while the finger piece is supported thereon by spring 105. As shown in Fig. 6, this angular motion is sufficient to move the latch spring 70 inwardly a distance sufficient to disengage projection 56 from latch opening 72 and release the lighter cap. Further inward movement of the upper end of the finger piece 100 is limited by engagement of the outer wall of slot 102 with the casing finger 87 so that the upper end of the latch releasing member can never be pushed inwardly a sufficient distance to become inoperative by engagement of its outer surface behind the inner surface of the casing window. When finger pressure is released, the yieldable latch 70 urges the finger piece outwardly until slot 102 is again aligned with the upper edge of the casing window at which time the coil spring 105 returns the finger piece to its normal position as shown in Fig. 7.

It will be observed that both ends of the latch releasing members are at all times under control of the upper and lower edges of the casing window 86. The finger 87 on the casing window serves in one position to limit inward pivoted motion, to a degree sufficient to release the latch spring 70, without obstructing disassembly removal of the releasing member, by turning movement in the opposite direction, for during such movement the finger rides in slot 106. However, in order to complete disassembly of the releasing member, it is necessary to move the member downwardly in the plane of the window nearby to the limit permitted by the height of slot 103, and a tool must be inserted into slot 102 so that sufficient force may be applied outwardly to turn the finger piece and snap its upper inner edge past the lower edge of the window against which it engages.

It will be noted that the construction and arrangement of my improved latch releasing member is such as to entirely negative accidental ignition of the lighter because the latch releasing member cannot be pressed inwardly to release the latch until it has first been moved downwardly against the pressure of spring 105. It is extremely unlikely that any accidental pressure on the finger piece can occur when the lighter is being carried in the pocket of the user, which will provide force of sufficient intensity, duration and sequence in the two directions, to operate the latch releasing button. In addition, the simplicity of construction of the releasing button is such as to warrant its use over the more costly constructions commercially practiced.

Having thus described my invention and illustrated its use, what I claim as new and desire to secure by Letters Patent is:

1. A pyrophoric lighter having a spring opening cover, a yieldable latch to retain the cover against opening and a casing having a window, a latch releasing member receivable in said window for manual movement, limit means to limit the initial movement of the member to a rectilinear direction for a prescribed amount, said limit means comprising portions of the member being shaped for cooperation with said window, and pivot means on the member to permit turning movement of the member with respect to the casing sufficient to release the latch only after said member has been moved rectilinearly for said prescribed amount, said pivot means comprising spaced apart elements at opposite sides of said member to freely embrace a transverse edge of said window, one of said elements embracing said transverse edge from inside said casing to prevent outward movement of said member and the other of said elements embracing said transverse edge from outside said casing to prevent inward movement of said member.

2. An unlatching member for a cigarette lighter whose cover is normally biased to open position and held closed by a yieldable latch and whose casing is provided with a window open to the yieldable latch and defined by opposed edges between which the unlatching member is receivable for movement to render the yieldable latch member inoperative and thus permit the cover to move to its normally biased open position; said unlatching member being enterable into the casing window and being provided with a slot having spaced apart walls at one end thereof to engage when so entered, about one of the opposed window defining edges, the spacing of said slot walls being such that the unlatching member may turn about said last mentioned window defining edge as a fulcrum, to displace the cover closing yieldable latch to cover releasing position, the other end of the unlatching member being provided with means engageable with the other opposed window defining edge to require an initial movement of the unlatching member in the plane of the window for a predetermined distance and a subsequent limited turning movement sufficient to displace the yieldable latch to release the cover to open position, said last named means comprising a pair of transverse slots in said other end of the unlatching member.

3. In a cigarette lighter of the class described, an outer casing having a window, a cap, spring urged to open position, a yieldable latch within the casing for releasably holding the cap in closed position, a finger extending from one edge of said window inwardly of its boundary, a latch releasing member movably received in said window, said member comprising, a hollow body, slots at each end of the body defining inner and outer walls to loosely embrace the window edges, an additional slot at one end of the body through said inner wall and transverse to said first-mentioned slot to permit entry of said finger upon assembly of the member with the casing and to receive the finger in the normal position of the latch releasing member, and a resilient member carried inside the body and engaging the window edge adjacent said other end slot, whereby said latch releasing member is operable to release the latch and open the cover by movement first in the direction of the plane of the casing wall for a distance to clear the slot at one end of the latch releasing member of the window edge and compress the resilient member at the other end, and thereafter by pivotal movement inwardly of the casing about said other end, on the window edge as a fulcrum, for an arc limited by engagement of said finger with said outer wall of the slot at said first end.

4. In a cigarette lighter, an open bottom fuel tank, a spring opening casing cover, and a yieldable spring latch for releasably holding the cover in a closed position, in combination with an outer fuel tank closing casing having an open top for slidably receiving said fuel tank assembly and having a window in one of its walls, a latch releasing finger piece supported by said window by opposed edges thereof to permit sliding disassembly of said fuel tank from the outer casing without interference by said finger, said outer casing being provided with an outwardly offset portion adjacent to said window in order to provide space between the casing and said fuel tank for receiving the inner portion of said finger piece and to permit sliding disassembly of said fuel tank from the outer casing without interference by said finger piece.

5. In a cigarette lighter, an open bottom fuel tank, a spring opening casing cover, and a yieldable spring latch for releasably holding the cover in a closed position, in combination with an outer fuel tank closing casing having an open top for slidably receiving said fuel tank assembly and having a window in one of its walls, a latch releasing finger piece supported by said window by opposed edges thereof to permit sliding disassembly of said fuel tank from the outer casing without interference by said finger, said fuel tank and outer casing being provided with cooperating means which prevent complete assembly of the two if improperly positioned relative to each other, said means including a projection on one and a recess on the other for receiving the projection when the two are properly positioned for assembly.

6. In combination, a fuel tank for use in a cigarette lighter of the type provided with an outer casing and a spring opening cap, and a latch spring secured to one wall of said fuel tank and having a latching portion for cap engagement extending above said fuel tank, said latch spring being outwardly offset from the fuel tank near its upper surface and having an inwardly and laterally extending ear movably seated in a notch in said upper surface of the fuel tank, said notch forming a stop to limit outward movement of the latch spring, whereby said cap will be properly engageable with said latching portion of the latch spring to latch the cap in lighter closing position in normal position of said latch spring.

7. A fulcrumed latch releasing assembly for a pyrophoric lighter of the type provided with a spring opening cap, a yieldable latch to retain the cover against opening and a casing having a latch receiving window; said assembly comprising a finger piece movably receivable in said window, said finger piece having an upwardly opening recess at its upper end to receive therewithin the upper ledge of said window to constrain the finger piece initially to a predetermined rectilinear downward movement to disengage said upwardly opening recess from said upper ledge of said window, said finger piece having a downwardly opening bore and spaced apart elements at the lower end of the assembly defining a channel for freely receiving therebetween the lower edge of the window as a fulcrum about which the finger piece may pivot after it has been given its initial downward movement and a spring within said bore normally operative to elevate said finger piece to engage the bottom of the recess against the bottom of the top window ledge.

8. A fulcrumed latch releasing member for a pyrophoric lighter of the type provided with a spring opening cap, a yieldable latch to retain the cap against opening, and a casing having an opening defined by edges between which the latch release member may be movable; said release member comprising a hollow body movably receivable in said casing opening, an upwardly opening slot at one end of the body for receipt of one edge of the casing opening, a downwardly opening slot in the other end of said body communicating with the hollow interior to receive the opposed edge of the casing opening to serve as a fulcrum about which the hollow body may be angled inwardly sufficiently to engage and release the latch after the hollow body has been moved rectilinearly for a predetermined distance, and a resilient member within said hollow body for urging the hollow body in the direction of said first-mentioned end.

9. Latch releasing means for a pyrophoric lighter of the type provided with a spring opening cap, a yieldable latch to retain the cover against opening and a casing having a latch receiving window; said latch releasing means comprising a finger piece movably receivable in said window, and having an upwardly opening recess at its upper end to receive therewithin the upper ledge of said window to constrain the finger piece initially to a rectilinear downward movement sufficient to disengage said upwardly opening recess from said upper ledge of said window, said finger piece having spaced apart elements at the lower end thereof which define a channel for freely receiving the lower ledge of the window as a fulcrum about which the finger piece may pivot after it has been given its initial downward movement.

References Cited in the file of this patent

UNITED STATES PATENTS

| Number | Name | Date |
|---|---|---|
| 1,028,462 | Heyman | June 9, 1912 |
| 1,035,666 | Wapulski et al. | Aug. 13, 1912 |
| 1,089,936 | Manent | Mar. 10, 1914 |
| 2,164,178 | Maltner | June 27, 1939 |
| 2,183,706 | Bass | Dec. 19, 1939 |
| 2,461,329 | Landwehr | Feb. 8, 1949 |
| 2,479,917 | Feurer | Aug. 23, 1949 |
| 2,527,998 | Hartzell | Oct. 31, 1950 |

FOREIGN PATENTS

| Number | Country | Date |
|---|---|---|
| 517,626 | Germany | Feb. 6, 1931 |
| 549,138 | France | Nov. 10, 1922 |